United States Patent
Gan et al.

(10) Patent No.: US 11,368,427 B1
(45) Date of Patent: Jun. 21, 2022

(54) SYSTEMS AND METHODS FOR VALIDATING NETWORK CONNECTIONS OF A VIRTUAL DISTRIBUTED UNIT

(71) Applicant: Verizon Patent and Licensing Inc., Basking Ridge, NJ (US)

(72) Inventors: Seng Gan, Ashburn, VA (US); Thomas L. Kelley, Whitehouse Station, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/500,549

(22) Filed: Oct. 13, 2021

(51) Int. Cl.
| | |
|---|---|
| G06F 15/16 | (2006.01) |
| G06F 9/54 | (2006.01) |
| H04L 29/06 | (2006.01) |
| H04L 61/5014 | (2022.01) |
| H04L 61/2517 | (2022.01) |
| H04L 61/5069 | (2022.01) |
| H04L 61/5061 | (2022.01) |

(52) U.S. Cl.
CPC ...... *H04L 61/2015* (2013.01); *H04L 61/2061* (2013.01); *H04L 61/2069* (2013.01); *H04L 61/2517* (2013.01)

(58) Field of Classification Search
CPC ............. H04L 61/2015; H04L 61/2061; H04L 61/2069; H04L 61/2517
USPC ....................................................... 709/245
See application file for complete search history.

(56) References Cited

U.S. PATENT DOCUMENTS

| | | | |
|---|---|---|---|
| 9,930,707 B2 * | 3/2018 | Ma .................... | H04W 76/11 |
| 2005/0114490 A1 * | 5/2005 | Redlich ............... | H04L 63/10 |
| | | | 709/223 |
| 2006/0084417 A1 * | 4/2006 | Melpignano ......... | H04L 69/16 |
| | | | 455/418 |
| 2008/0294915 A1 * | 11/2008 | Juillerat ............. | H04L 12/40045 |
| | | | 713/300 |
| 2010/0287266 A1 * | 11/2010 | Asati .................. | H04L 45/04 |
| | | | 709/222 |
| 2012/0331119 A1 * | 12/2012 | Bose .................. | H04L 41/0809 |
| | | | 709/223 |
| 2015/0052522 A1 * | 2/2015 | Chanda .............. | G06F 9/455 |
| | | | 718/1 |
| 2016/0044114 A1 * | 2/2016 | Xie .................... | H05K 999/99 |
| | | | 709/220 |
| 2019/0342262 A1 * | 11/2019 | Peng .................. | H04L 61/2571 |
| 2020/0044917 A1 * | 2/2020 | Peng .................. | H04L 29/12216 |
| 2021/0271506 A1 * | 9/2021 | Ganguly ............. | H04L 63/0823 |

* cited by examiner

*Primary Examiner* — Hamza N Algibhah

(57) ABSTRACT

A device may identify network interfaces of the device and may create a list of the network interfaces of the device. The device may receive a cell site name associated with the device and may generate dynamic host configuration protocol (DHCP) requests with a DHCP option that includes data identifying the cell site name and the network interfaces of the list. The device may broadcast the DHCP requests to one or more components that are connected, via connections, to the network interfaces, and may cause, based on broadcasting the DHCP requests to the one or more components, a user equipment to receive an indication of whether the connections to the network interfaces are valid.

20 Claims, 9 Drawing Sheets

SYSTEMS AND METHODS FOR VALIDATING NETWORK CONNECTIONS OF A VIRTUAL DISTRIBUTED UNIT

BACKGROUND

In a virtual radio access network (vRAN), some network components are unconfigured computers with several identical network interfaces. For example, a virtual distributed unit (vDU) is an unconfigured computer with several network interfaces that connect to a remote unit (RU), a cell site router (CSR), and other components of the vRAN at the same time. The vDU may not be configured when the vDU is first installed at a cell site of the vRAN and connected to the RU, the CSR, and the other components.

DETAILED DESCRIPTION OF PREFERRED EMBODIMENTS

Figure 1A:
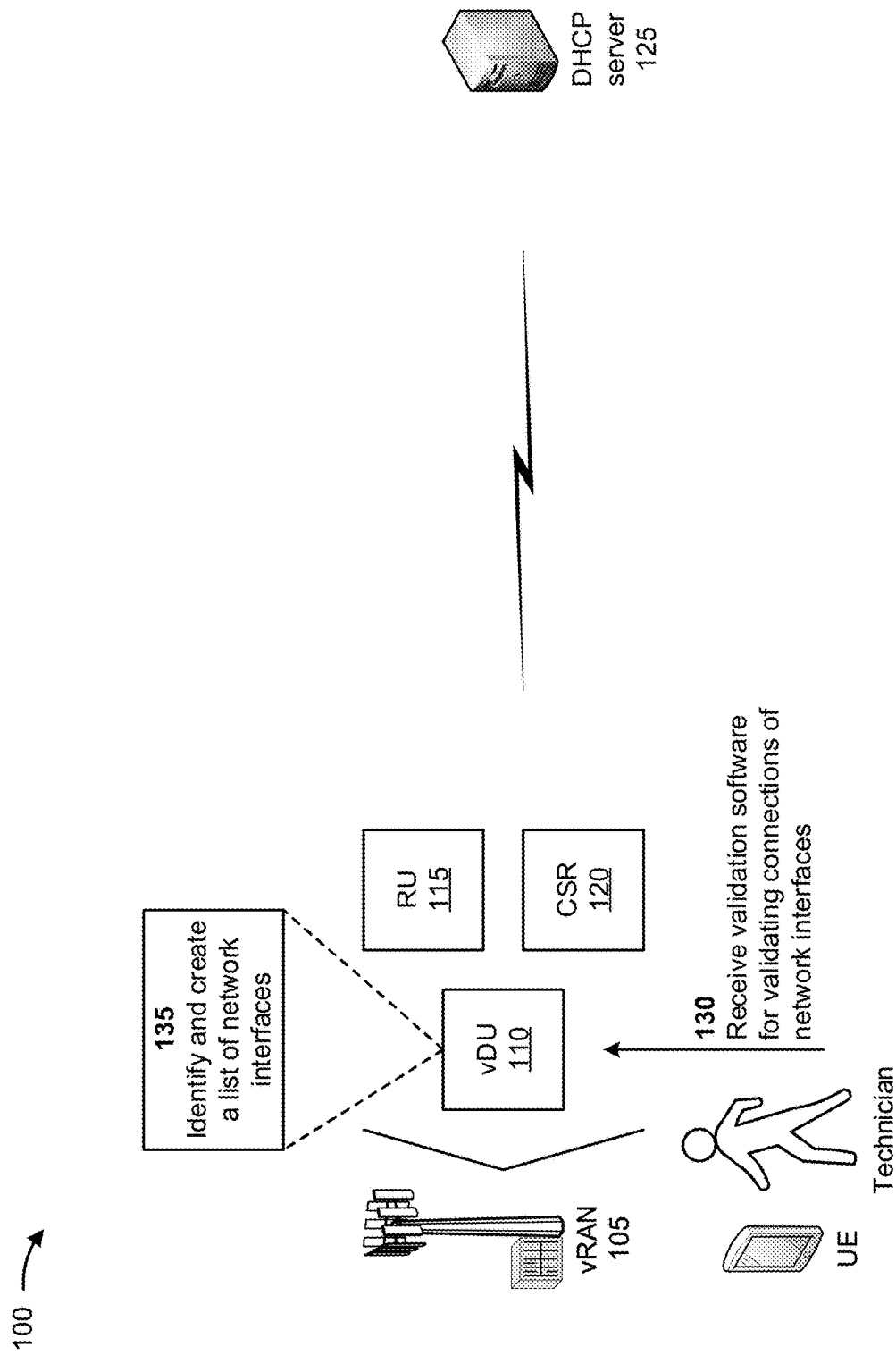
FIGS. 1A-1F are diagrams of one or more example implementations described herein.

The following detailed description of example implementations refers to the accompanying drawings. The same reference numbers in different drawings may identify the same or similar elements.

A technician may travel to a cell site (e.g., a vRAN) to connect network interfaces of the vDU with one or more components of the vRAN, such as the RU and the CSR. However, the technician is unable to validate that the connections with the network interfaces of the vDU are correct or that connection cables are operable since the vDU is an unconfigured device. If the vDU is connected incorrectly or a connection cable is inoperable, the technician will have to return to the cell site and reconnect the vDU. Thus, current techniques for connecting network interfaces of the vDU consume human resources, computing resources (e.g., processing resources, memory resources, communication resources, and/or the like), networking resources, transportation resources, and/or the like associated with incorrectly connecting the vDU with one or more other components of the vDU, utilizing an inoperable cable to connect the vDU with one or more other components of the vDU, traveling to the cell site to correct an incorrect connection or an inoperable cable, and/or the like.

Some implementations described herein provide a device (e.g., a vDU or a dynamic host configuration protocol (DHCP) server) that validates network connections of the vDU. For example, the device may identify network interfaces of the device and may create a list of the network interfaces of the device. The device may receive a location identifier (e.g., a cell site name) associated with the device and may generate DHCP requests with a particular DHCP option that includes data identifying the cell site name and the network interfaces of the list. The device may broadcast the DHCP requests to one or more components that are connected, via connections, to the network interfaces. The one or more components may add data identifying received ports of the one or more components to the DHCP option to generate modified DHCP requests and may forward the modified DHCP requests to a DHCP server. The DHCP server may determine whether the connections to the network interfaces are valid based on the modified DHCP requests. The DHCP server may provide, to a user equipment (UE) associated with a technician configuring the device, an indication of whether the connections to the network interfaces are valid. The technician may correct one or more invalid connections when the indication indicates that one or more connections are invalid, while on-site. In contrast, without the embodiments described herein, invalid network connections are only discovered after the technician has left, and he/she must then return to fix the issue.

In this way, the device (e.g., the vDU or the DHCP server) validates network connections of the vDU. For example, the vDU may be preconfigured with software that causes the vDU to request and receive a cell site name from the technician. The vDU may detect all network interfaces of the vDU and may generate a list of the network interfaces. The vDU may generate DHCP requests with a DHCP option that includes data identifying the cell site name and slots and port numbers for the network interfaces of the list and may broadcast the DHCP requests to other components of the vDU. The other components may modify the DHCP requests to include received ports of the other components and may forward the modified DHCP requests to the DHCP server. The DHCP server may validate the connections of the network interfaces with the other components. Thus, implementations described herein conserve computing resources, networking resources, transportation resources, and/or the like that would otherwise have been consumed by incorrectly connecting the vDU with one or more other components of the vDU, utilizing an inoperable cable to connect the vDU with one or more other components of the vDU, traveling to the cell site to correct an incorrect connection or an inoperable cable, and/or the like.

FIGS. 1A-1F are diagrams of one or more example implementations 100 described herein. As shown in FIG. 1A, a vRAN 105 may be associated with a DHCP server 125. The vRAN 105 may include a vDU 110, an RU 115, and a CSR 120. A technician, associated with a UE, may travel to a location of the vRAN 105 to connect the vDU 110 to one or more components (e.g., the RU 115 and the CSR 120) of the vRAN 105. The UE may include a communication device and/or a computing device, such as a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. Further details of the vRAN 105, the vDU 110, the RU 115, the CSR 120, and the DHCP server 125 are provided elsewhere herein. Although implementations are described herein with respect to the vRAN 105, the implementations may be utilized to verify network interfaces and/or connections between other types of network devices.

As further shown in FIG. 1A, and by reference number 130, the vDU 110 may receive validation software for validating connections of network interfaces of the vDU 110. For example, the technician may connect a flash drive, with the validation software, to the vDU 110, and may cause the flash drive to install the validation software on the vDU 110. Alternatively, the technician may load a disk, with the validation software, in the vDU 110, and may cause the disk to install the validation software on the vDU 110. In some implementations, the validation software may be preinstalled on the vDU 110 and may execute when the vDU 110 is powered on by the technician. In some implementations, the validation software may be wirelessly installed on the vDU 110 via an over-the-air installation initiated by the technician. In some implementations, the validation software may include software that, when executed by the vDU 110, causes the vDU 110 to perform functions to enable the vDU 110 to validate connections of the network interfaces of the vDU 110 (e.g., to ensure that the connections are correct and operable).

As further shown in FIG. 1A, and by reference number 135, the vDU 110 may identify the network interfaces of the vDU 110 and may create a list of the network interfaces. For example, the validation software may cause the vDU 110 to identify the network interfaces of the vDU 110 based on interaction with an operating system, hardware drivers, and/or the like associated with the vDU 110. The validation software may cause the vDU 110 to create the list of the network interfaces and to store the list of the network interfaces in a data structure (e.g., a database, a table, a list, and/or the like) associated with the vDU 110.

Figure 1B:
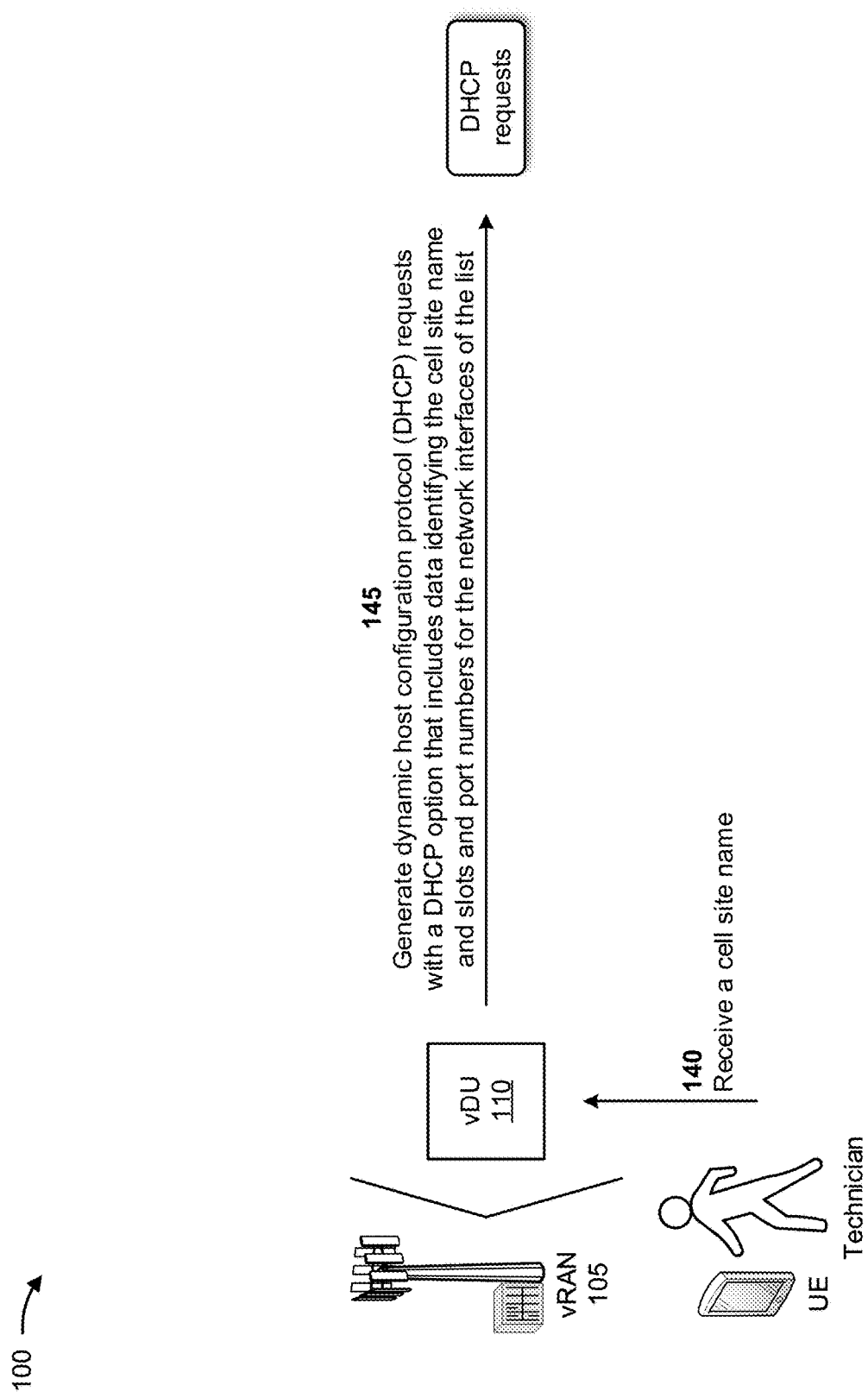

As shown in FIG. 1B, and by reference number 140, the vDU 110 may receive a cell site name (e.g., a location identifier) associated with the vRAN 105. For example, the validation software may cause the vDU 110 to display, to the technician, a request for the cell site name associated with the vRAN 105. The technician may utilize an input component of the vDU 110 to provide the cell site name to the vDU 110. In some implementations, the technician may utilize the UE to communicate with the vDU 110 and to provide the cell site name to the vDU 110. In some implementations, the cell site name associated with the vRAN 105 may be wirelessly provided to the vDU 110 via an over-the-air message initiated by the technician.

As further shown in FIG. 1B, and by reference number 145, the vDU 110 may generate DHCP requests with a DHCP option that includes data identifying the cell site name and slots and port numbers for the network interfaces of the list. In some implementations, the technician may connect connection cables between the network interfaces of the vDU 110 and ports of the RU 115 and the CSR 120. For example, the vDU 110 may include a first slot (e.g., Slot 1) with two ports (e.g., Port 1 and Port 2) and a second slot (e.g., Slot 2) with two ports (e.g., Port 3 and Port 4). The RU 115 may include two ports (e.g., Port A and Port B) and the CSR 120 may include two ports (e.g., Port C and Port D). The technician may connect a first connection cable to Port 1 of Slot 1 of the vDU 110 and to Port C of the CSR 120; may connect a second connection cable to Port 2 of Slot 1 of the vDU 110 and to Port D of the CSR 120; may connect a third connection cable to Port 3 of Slot 2 of the vDU 110 and to Port A of the RU 115; and may connect a fourth connection cable to Port 4 of Slot 2 of the vDU 110 and to Port B of the RU 115. After connecting the cables, the technician and/or the validating software may cause the vDU 110 to generate the DHCP requests with the DHCP option that includes data identifying the cell site name and the slots and port numbers for the network interfaces of the list. Based on the example above, the DHCP option may include data identifying one or more of Slot 1, Slot 2, Port 1, Port 2, Port 3, and Port 4.

Figure 1C:
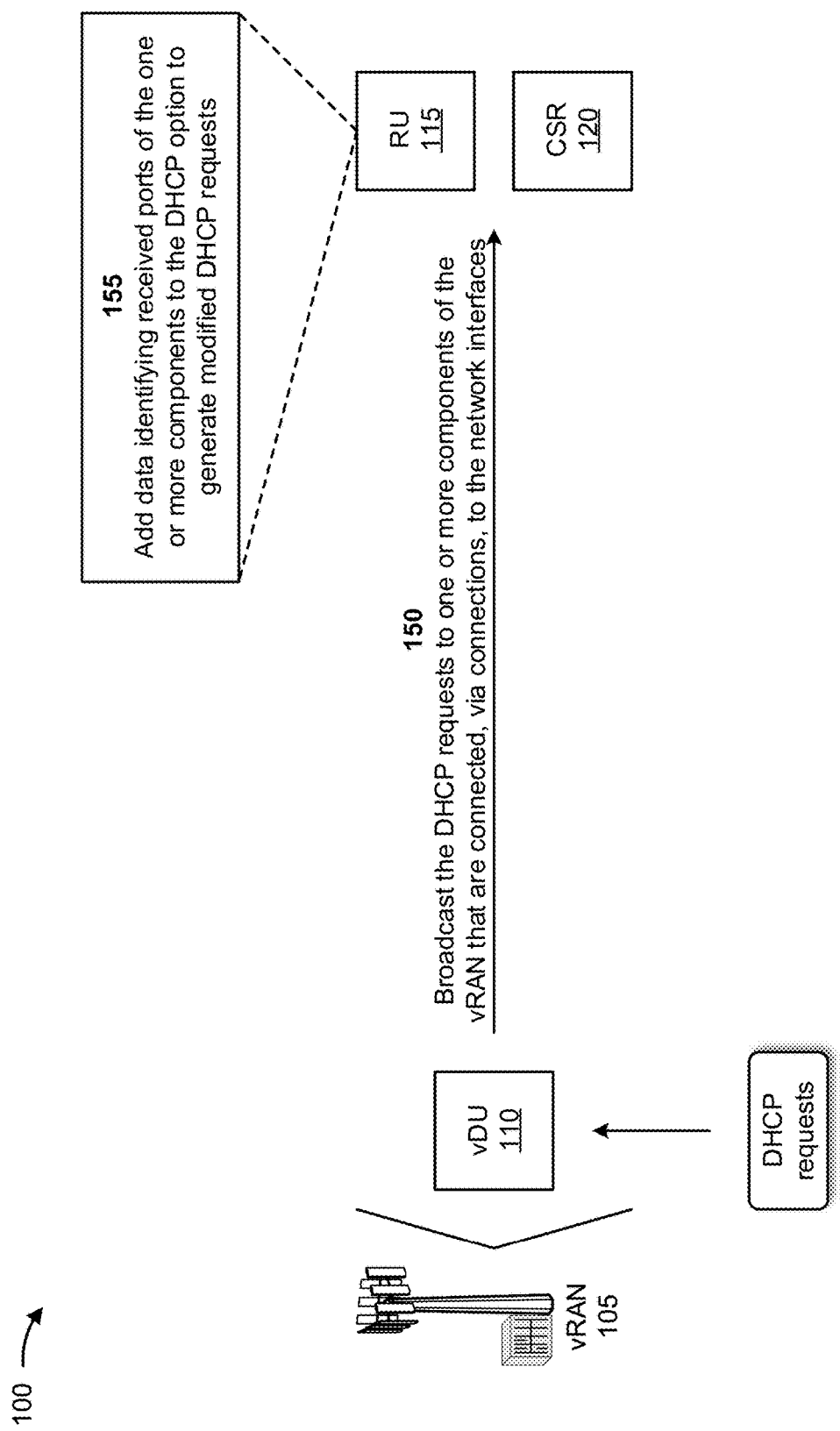

As shown in FIG. 1C, and by reference number 150, the vDU 110 may broadcast the DHCP requests to one or more components of the vRAN 105 (e.g., the RU 115 and/or the CSR 120) that are connected, via connections, to the network interfaces. For example, the vDU 110 may broadcast each of the DHCP requests, from a corresponding one of the network interfaces of the vDU 110, to the one or more components of the vRAN 105. In some implementations, the one or more components may include the RU 115 and the CSR 120, and ports of the RU 115 and the CSR 120 may be connected to the network interfaces of the vDU 110 via connection cables, as described above. If the first connection cable connects Port 1 of Slot 1 of the vDU 110 and Port C of the CSR 120, then Port C of the CSR 120 may receive a DHCP request with a DHCP option identifying Port 1 and Slot 1 of the vDU 110. If the second connection cable connects Port 2 of Slot 1 of the vDU 110 and Port D of the CSR 120, then Port D of the CSR 120 may receive a DHCP request with a DHCP option identifying Port 2 and Slot 1 of the vDU 110. If the third connection cable connects Port 3 of Slot 2 of the vDU 110 and Port A of the RU 115, then Port A of the RU 115 may receive a DHCP request with a DHCP option identifying Port 3 and Slot 2 of the vDU 110. If the fourth connection cable connects Port 4 of Slot 2 of the vDU 110 and Port B of the RU 115, then Port B of the RU 115 may receive a DHCP request with a DHCP option identifying Port 4 and Slot 2 of the vDU 110.

As further shown in FIG. 1C, and by reference number 155, the one or more components of the vRAN 105 (e.g., the RU 115 and/or the CSR 120) may add data identifying received ports of the one or more components to the DHCP option to generate modified DHCP requests. For example, the one or more components may receive the DHCP requests on corresponding received ports and may add data identifying the corresponding received ports to the DHCP option of each of the DHCP requests, to generate the modified DHCP requests. In some implementations, Port C of the CSR 120 may receive the DHCP request with the DHCP option identifying Port 1 and Slot 1 of the vDU 110. The CSR 120 may modify the DHCP option of the DHCP request, to include Port C of the CSR 120 and to generate a modified DHCP request. Port D of the CSR 120 may receive the DHCP request with the DHCP option identifying Port 2 and Slot 1 of the vDU 110. The CSR 120 may modify the DHCP option of the DHCP request, to include Port D of the CSR 120 and to generate a modified DHCP request. Port A of the RU 115 may receive the DHCP request with the DHCP option identifying Port 3 and Slot 2 of the vDU 110. The RU 115 may modify the DHCP option of the DHCP request, to include Port A of the RU 115 and to generate a modified DHCP request. Port B of the RU 115 may receive a DHCP request with a DHCP option identifying Port 4 and Slot 2 of the vDU 110. The RU 115 may modify the DHCP option of the DHCP request, to include Port B of the RU 115 and to generate a modified DHCP request.

Figure 1D:
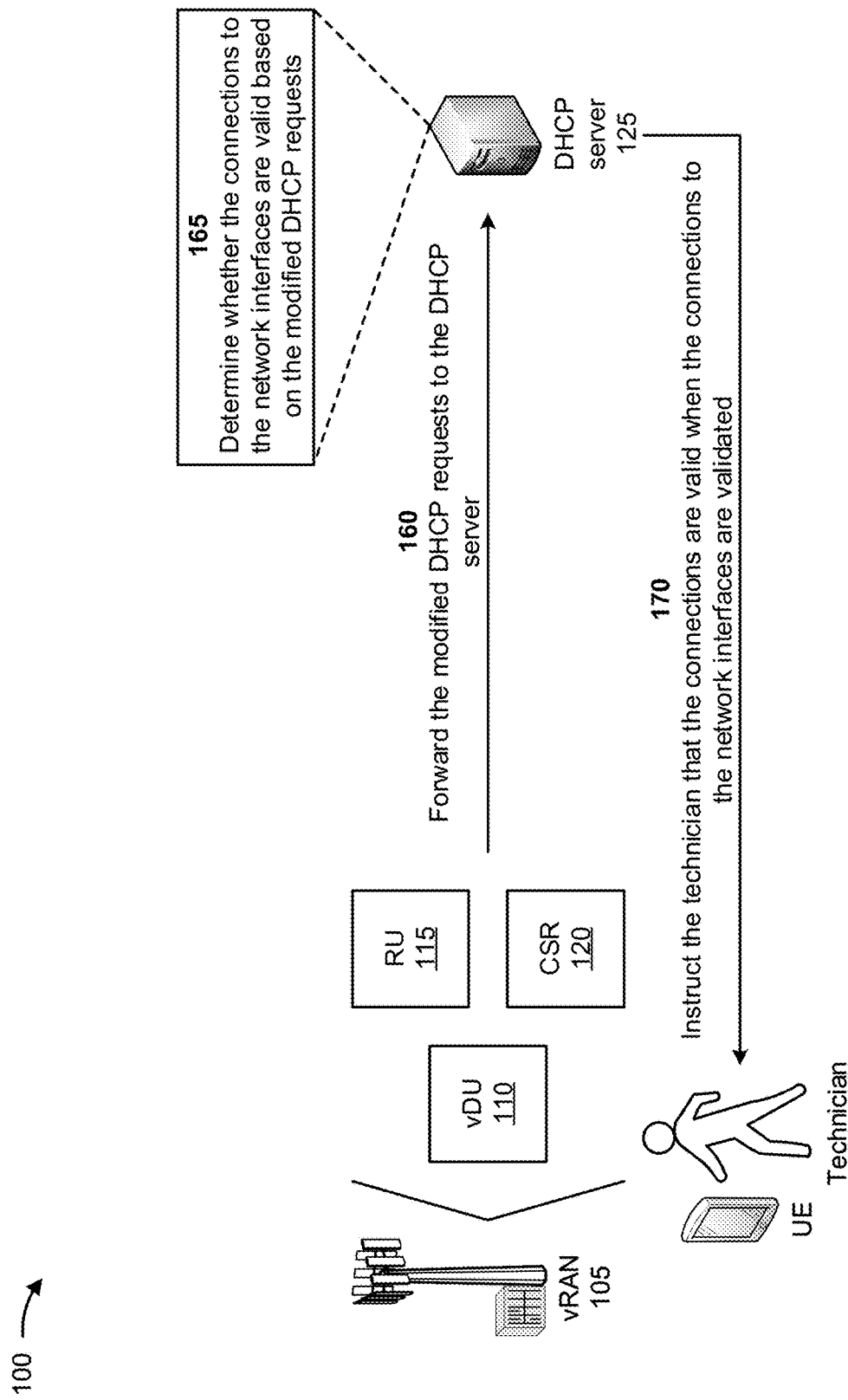

As shown in FIG. 1D, and by reference number 160, the one or more components of the vRAN 105 (e.g., the RU 115 and/or the CSR 120) may forward the modified DHCP requests to the DHCP server 125. For example, for each of the received ports, the one or more components of the vRAN 105 may forward one of the modified DHCP requests to the DHCP server 125. In some implementations, the CSR 120 may modify the DHCP option of the DHCP request, to include Port C of the CSR 120 and to generate a first modified DHCP request and may modify the DHCP option, of the DHCP request, to include Port D of the CSR 120 and to generate a second modified DHCP request. In such implementations, the CSR 120 may forward the first modified DHCP request (e.g., identifying Port C) and the second modified DHCP request (e.g., identifying Port D) to the DHCP server 125. In some implementations, the RU 115 may modify the DHCP option of the DHCP request, to include Port A of the RU 115 and to generate a first modified DHCP request, and may modify the DHCP option, of the DHCP request, to include Port B of the RU 115 and to generate a second modified DHCP request. In such implementations, the RU 115 may forward the first modified DHCP request (e.g., identifying Port A) and the second modified DHCP request (e.g., identifying Port B) to the DHCP server 125.

As further shown in FIG. 1D, and by reference number 165, the DHCP server 125 may determine whether the connections to the network interfaces are valid based on the modified DHCP requests. For example, the DHCP server 125 may include a data structure that stores a DHCP log identifying correct data to be included in DHCP options of DHCP requests. In some implementations, the DHCP log may include an entry identifying the cell site name of the vRAN 105, Port 1 and Slot 1 of the vDU 110, and Port C of the CSR 120; an entry identifying the cell site name of the vRAN 105, Port 2 and Slot 1 of the vDU 110, and Port D of the CSR 120; an entry identifying the cell site name of the vRAN 105, Port 3 and Slot 2 of the vDU 110, and Port A of the RU 115; an entry identifying the cell site name of the vRAN 105, Port 4 and Slot 2 of the vDU 110, and Port B of the RU 115; and/or the like. The DHCP server 125 may compare the DHCP log with the DHCP options included in the modified DHCP requests and may determine whether the connections to the network interfaces of the vDU 110 are valid based on comparing the DHCP log with the DHCP options included in the modified DHCP requests.

In some implementations, the DHCP server 125 (or an intermediate device) may be programmed to determine that the connections to the network interfaces of the vDU 110 are valid when entries in the DHCP log match the DHCP options included in the modified DHCP requests. In some implementations, the DHCP server 125 may determine that at least one of the connections to the network interfaces of the vDU 110 is invalid when entries in the DHCP log fail to match at least one of the DHCP options included in the modified DHCP requests.

In some implementations, multiple DHCP servers 125 may be provided, and the one or more components may not add the data identifying received ports of the one or more components to the DHCP option to generate modified DHCP requests. Instead, the one or more components may forward each of the DHCP requests to a different DHCP server 125 depending on the received port of the one or more components associated with the DHCP request. Each of the DHCP servers 125 may include a data structure that stores a DHCP log identifying correct data to be included in DHCP options of DHCP requests. For example, a first DHCP log of a first DHCP server 125 may include an entry identifying the cell site name of the vRAN 105 and Port 1 and Slot 1 of the vDU 110. A second DHCP log of a second DHCP server 125 may include an entry identifying the cell site name of the vRAN 105 and Port 2 and Slot 1 of the vDU 110. A third DHCP log of a third DHCP server 125 may include an entry identifying the cell site name of the vRAN 105 and Port 3 and Slot 2 of the vDU 110. A fourth DHCP log of a fourth DHCP server 125 may include an entry identifying the cell site name of the vRAN 105 and Port 4 and Slot 2 of the vDU 110. Each of the DHCP servers 125 may compare the DHCP log with the DHCP options included in the DHCP requests and may determine whether the connections to the network interfaces of the vDU 110 are valid based on comparing the DHCP log with the DHCP options included in the DHCP requests.

As further shown in FIG. 1D, and by reference number 170, the DHCP server 125 may instruct the technician that the connections are valid when the connections to the network interfaces are validated. For example, the DHCP server 125 may determine that the connections to the network interfaces of the vDU 110 are valid when entries in the DHCP log match the DHCP options included in the modified DHCP requests. The DHCP server 125 may generate a message indicating that the connections are valid based on determining that the connections to the network interfaces of the vDU 110 are valid. The DHCP server 125 may provide the message to the UE, and the UE may display the message to the technician so that the technician may be instructed that the connections are valid.

Figure 1E:
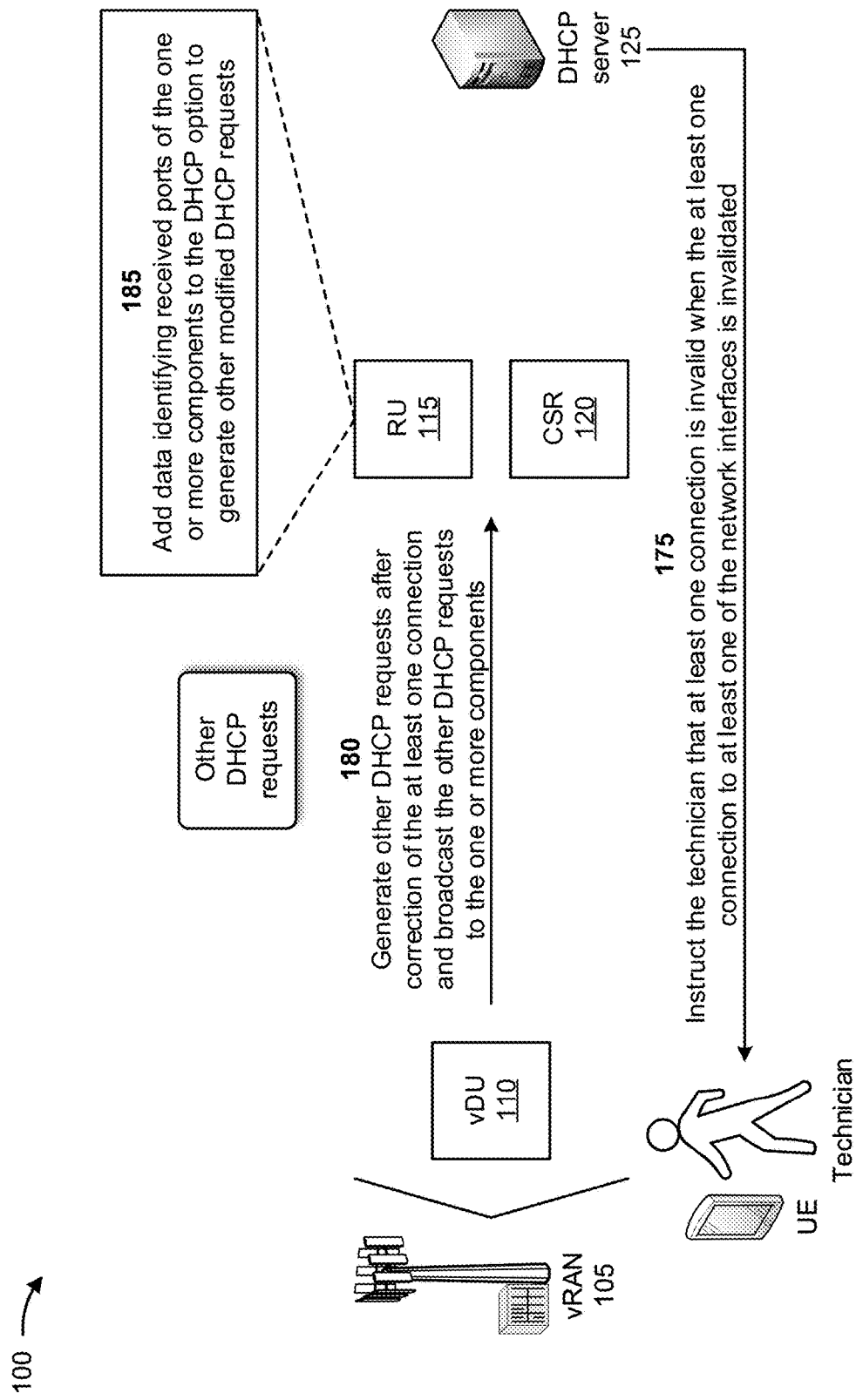

As shown in FIG. 1E, and by reference number 175, the DHCP server 125 may instruct the technician that at least one connection is invalid when the at least one connection to at least one of the network interfaces is invalidated. For example, the DHCP server 125 may determine that at least one of the connections to the network interfaces of the vDU 110 is invalid when entries in the DHCP log fail to match at least one of the DHCP options included in the modified DHCP requests. The DHCP server 125 may generate a message indicating that at least one of the connections is invalid based on determining that at least one of the connections to the network interfaces of the vDU 110 is valid. The DHCP server 125 may provide the message to the UE, and the UE may display the message to the technician so that the technician may be instructed that at least one of the connections is valid. The technician may correct the at least one of the connections based on the message and may cause the vDU 110 to generate additional DHCP requests based on the technician correcting the at least one of the connections. In some implementations, an intermediate device (e.g., other than the DHCP server 125) may perform the functionality described above in connection with the DHCP server 125.

As further shown in FIG. 1E, and by reference number 180, the vDU 110 may generate other DHCP requests after correction of at least one connection and may broadcast the other DHCP requests to the one or more components (e.g., the RU 115 and/or the CSR 120). For example, after correcting the at least one of the connections (e.g., via replacing an inoperable cable, switching a port of a cable, and/or the like), the technician and/or the validating software may cause the vDU 110 to generate the other DHCP requests with the DHCP option that includes data identifying the cell site name and the slots and port numbers for the network interfaces of the list. The vDU 110 may broadcast each of the other DHCP requests, from a corresponding one of the network interfaces of the vDU 110, to the one or more components of the vRAN 105. In some implementations, the one or more components may include the RU 115 and the CSR 120, and ports of the RU 115 and the CSR 120 may be connected to the network interfaces of the vDU 110 via connection cables, as described above.

As further shown in FIG. 1E, and by reference number 185, the one or more components (e.g., the RU 115 and/or the CSR 120) may add data identifying received ports of the one or more components to the DHCP option to generate other modified DHCP requests. For example, the one or more components may receive the other DHCP requests on corresponding received ports and may add data identifying the corresponding received ports to the DHCP option of each of the other DHCP requests, to generate the other modified DHCP requests, as described above in connection with FIG. 1C.

Figure 1F:
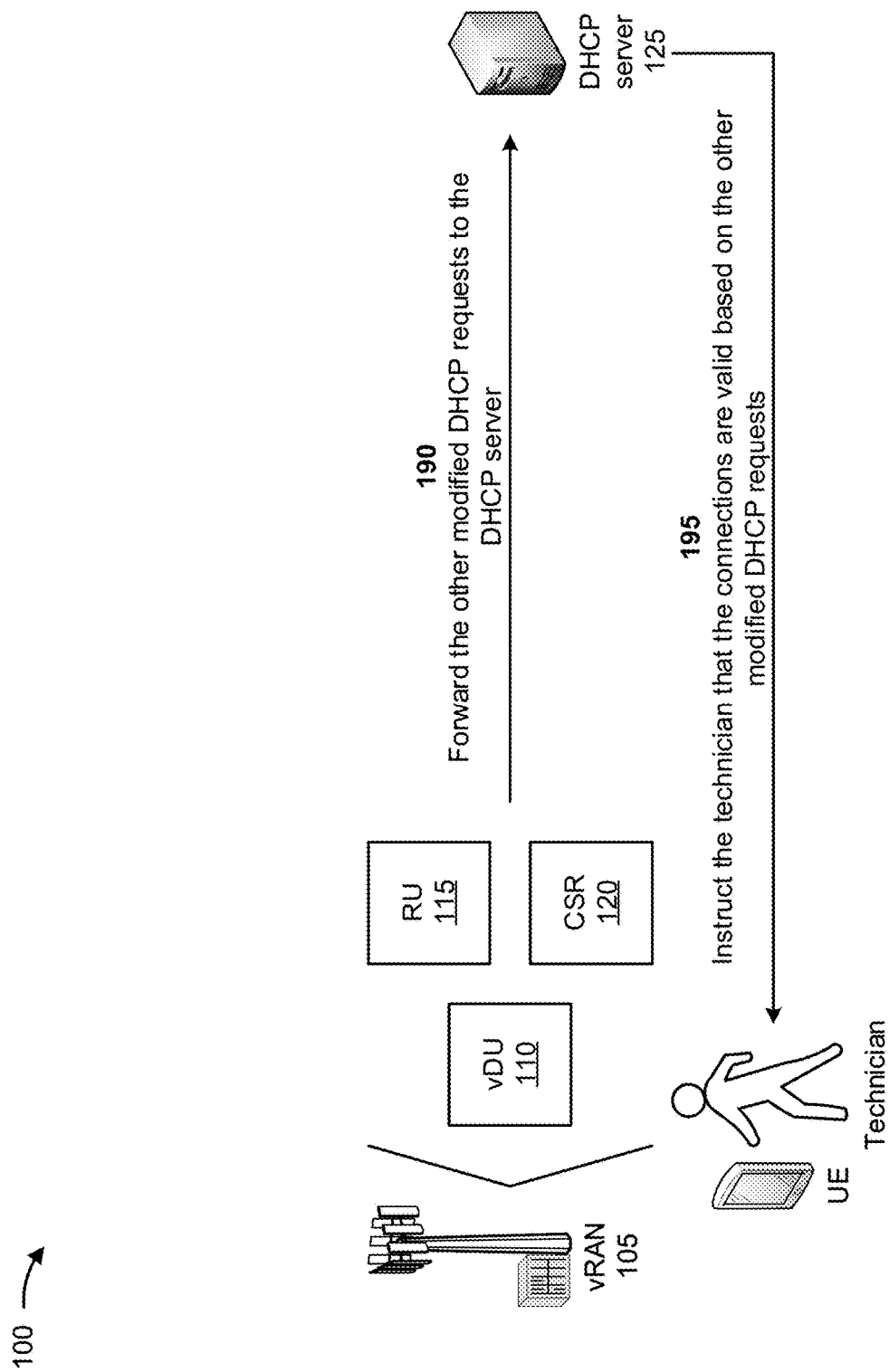

As shown in FIG. 1F, and by reference number 190, the one or more components (e.g., the RU 115 and/or the CSR 120) may forward the other modified DHCP requests to the DHCP server 125. For example, for each of the received ports, the one or more components of the vRAN 105 may forward one of the other modified DHCP requests to the DHCP server 125, as described above in connection with FIG. 1D.

As further shown in FIG. 1F, and by reference number 195, the DHCP server 125 may instruct the technician that the connections are valid based on the other modified DHCP requests. For example, the DHCP server 125 may compare the DHCP log with the DHCP options included in the other modified DHCP requests and may determine whether the connections to the network interfaces of the vDU 110 are valid based on comparing the DHCP log with the DHCP options included in the other modified DHCP requests. In some implementations, the DHCP server 125 may determine that the connections to the network interfaces of the vDU 110 are valid when entries in the DHCP log match the DHCP options included in the other modified DHCP requests. The DHCP server 125 may generate a message indicating that the connections are valid based on determining that the connections to the network interfaces of the vDU 110 are valid. The DHCP server 125 may provide the message to the UE, and the UE may display the message to the technician so that the technician may be instructed that the connections are valid.

In this way, the device (e.g., the vDU 110 or the DHCP server 125) validates network connections of the vDU 110. For example, the vDU 110 may be preconfigured with software that causes the vDU to request and receive a cell site name from a technician. The vDU 110 may detect all network interfaces of the vDU 110 and may generate a list of the network interfaces. The vDU 110 may generate DHCP requests with a DHCP option that includes data identifying the cell site name and slots and port numbers for the network interfaces of the list and may broadcast the DHCP requests to other components of the vDU 110. The other components may modify the DHCP requests to include received ports of the other components and may forward the modified DHCP requests to the DHCP server 125. The DHCP server 125 may validate the connections of the network interfaces with the other components. Thus, implementations described herein conserve computing resources, networking resources, transportation resources, and/or the like that would otherwise have been consumed by incorrectly connecting the vDU 110 with one or more other components of the vDU 110, utilizing an inoperable cable to connect the vDU 110 with one or more other components of the vDU 110, traveling to the cell site to correct an incorrect connection or an inoperable cable, and/or the like.

Although implementations are described herein in connection with DHCP options of DHCP requests, the implementations may be utilized with other headers of the DHCP requests, with DHCP requests that are modified to include an extra parameter, and/or the like.

As indicated above, FIGS. 1A-1F are provided merely as examples. Other examples may differ from what was described with regard to FIGS. 1A-1F. The number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of FIGS. 1A-1F may perform one or more functions described as being performed by another set of devices of FIGS. 1A-1F.

Figure 2:
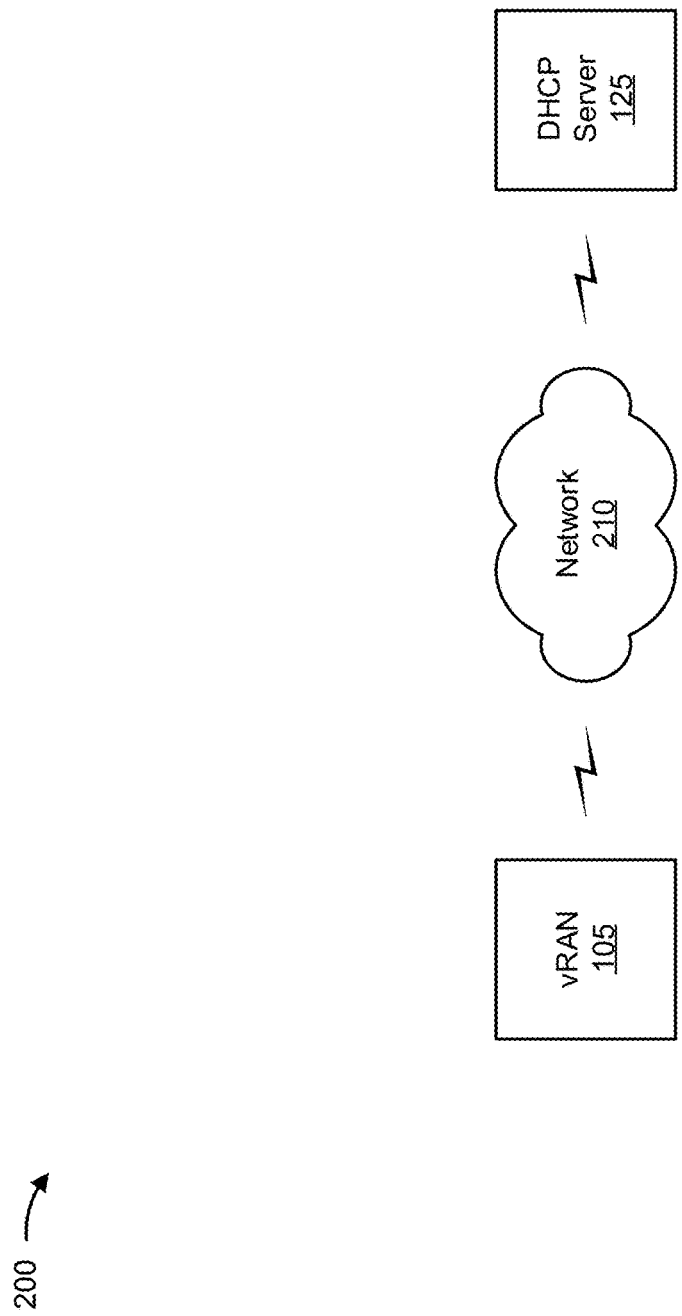
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the vRAN 105, the DHCP server 125, and a network 210. Devices of the environment 200 may interconnect via wired connections, wireless connections, or a combination of wired and wireless connections.

The vRAN 105 may support, for example, a cellular radio access technology (RAT). The vRAN 105 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that may support wireless communication for a UE. The vRAN 105 may transfer traffic between the UE (e.g., using a cellular RAT), one or more base stations (e.g., using a wireless interface or a backhaul interface, such as a wired backhaul interface), and/or a core network. The vRAN 105 may provide one or more cells that cover geographic areas.

In some implementations, the vRAN 105 may perform scheduling and/or resource management for the UE covered by the vRAN 105 (e.g., the UE covered by a cell provided by the vRAN 105). In some implementations, the vRAN 105 may be controlled or coordinated by a network controller, which may perform load balancing, network-level configuration, and/or the like. The network controller may communicate with the vRAN 105 via a wireless or wireline backhaul. In some implementations, the vRAN 105 may include a network controller, a self-organizing network (SON) module or component, or a similar module or component. In other words, the vRAN 105 may perform network control, scheduling, and/or network management functions (e.g., for uplink, downlink, and/or sidelink communications of the UE covered by the vRAN 105).

The vRAN 105 may include the vDU 110, the RU 115, the CSR 120, and one or more other components. The vDU 110 includes a device that executes a radio link control (RLC) layer, a medium access control (MAC) layer, and portions of a physical (PHY) layer. The vDU 110 may include a logical node that executes a subset of functions of the vRAN 105 and is controlled by a central unit.

The RU 115 (e.g., also referred to as a remote radio unit) includes a remote radio transceiver that connects to an operator radio control panel via an electrical interface or a wireless interface. The RU 115 may include radio frequency (RF) circuitry, analog-to-digital/digital-to-analog converters, and up/down converters of the vRAN 105. The RU 115 may include operation and management processing capabilities and a standardized optical interface to connect to other components of the vRAN 105.

Cell sites (e.g., the vRAN 105) may include one or more RUs 115 connected to local baseband units. The CSR 120 includes a device that aggregates traffic from the baseband units and backhauls the traffic over an aggregation network to a core network.

The DHCP server 125 includes one or more devices capable of receiving, generating, storing, processing, providing, and/or routing information, as described elsewhere herein. The DHCP server 125 may include a communication device and/or a computing device. For example, the DHCP server 125 may include a server, such as an application server, a client server, a web server, a database server, a host server, a proxy server, a virtual server (e.g., executing on computing hardware), or a server in a cloud computing system. In some implementations, the DHCP server 125 includes computing hardware used in a cloud computing environment.

The network 210 includes one or more wired and/or wireless networks. For example, the network 210 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN), and/or the like), a private network, an ad hoc network, an intranet, the Internet, a fiber optic-based network, a cloud computing network, or the like, and/or a combination of these or other types of networks).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
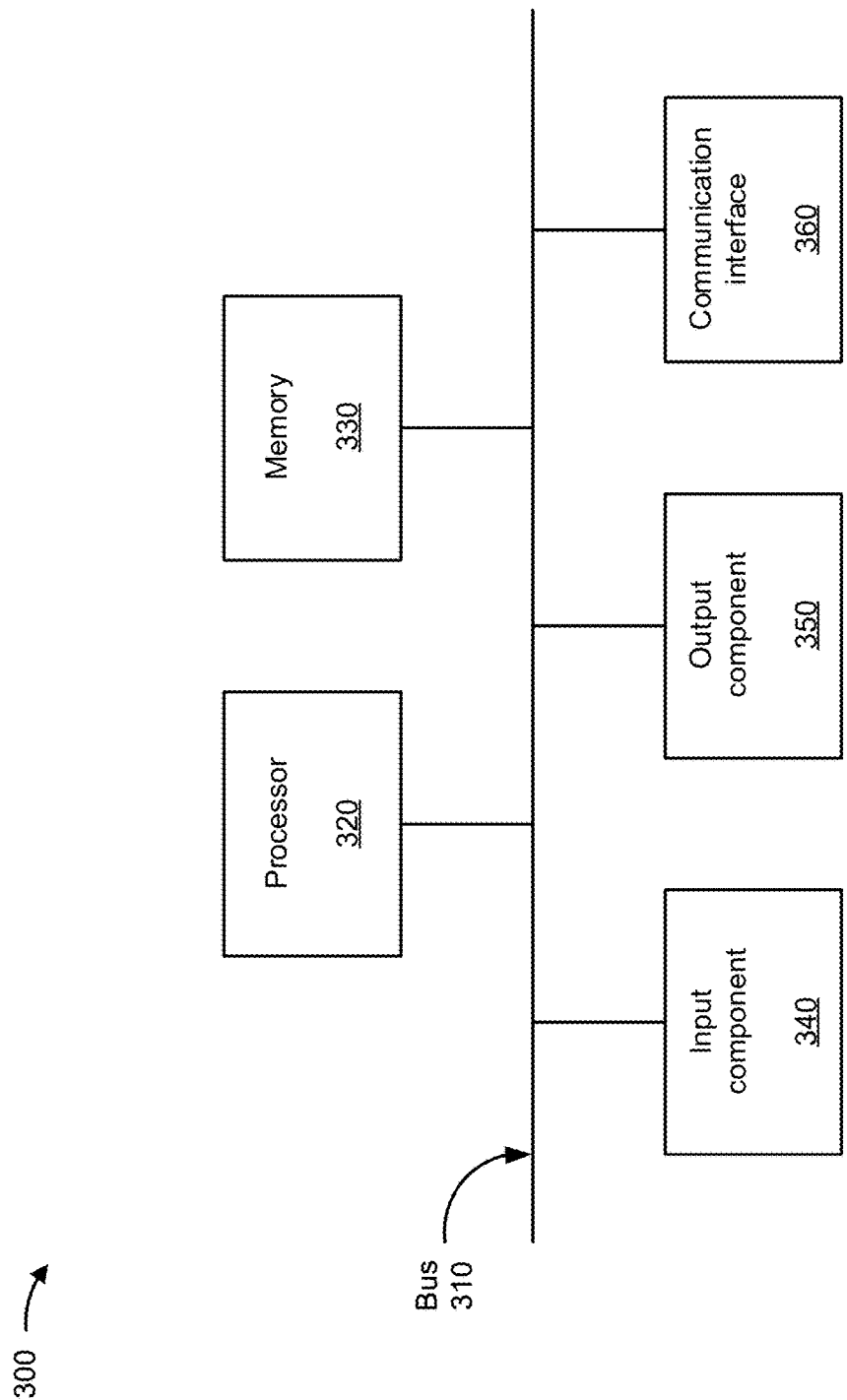
FIG. 3 is a diagram of example components of one or more devices of FIG. 2.

FIG. 3 is a diagram of example components of a device 300. The device 300 may correspond to the vRAN 105, the vDU 110, the RU 115, the CSR 120, and/or the DHCP server 125. In some implementations, the vRAN 105, the vDU 110, the RU 115, the CSR 120, and/or the DHCP server 125 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
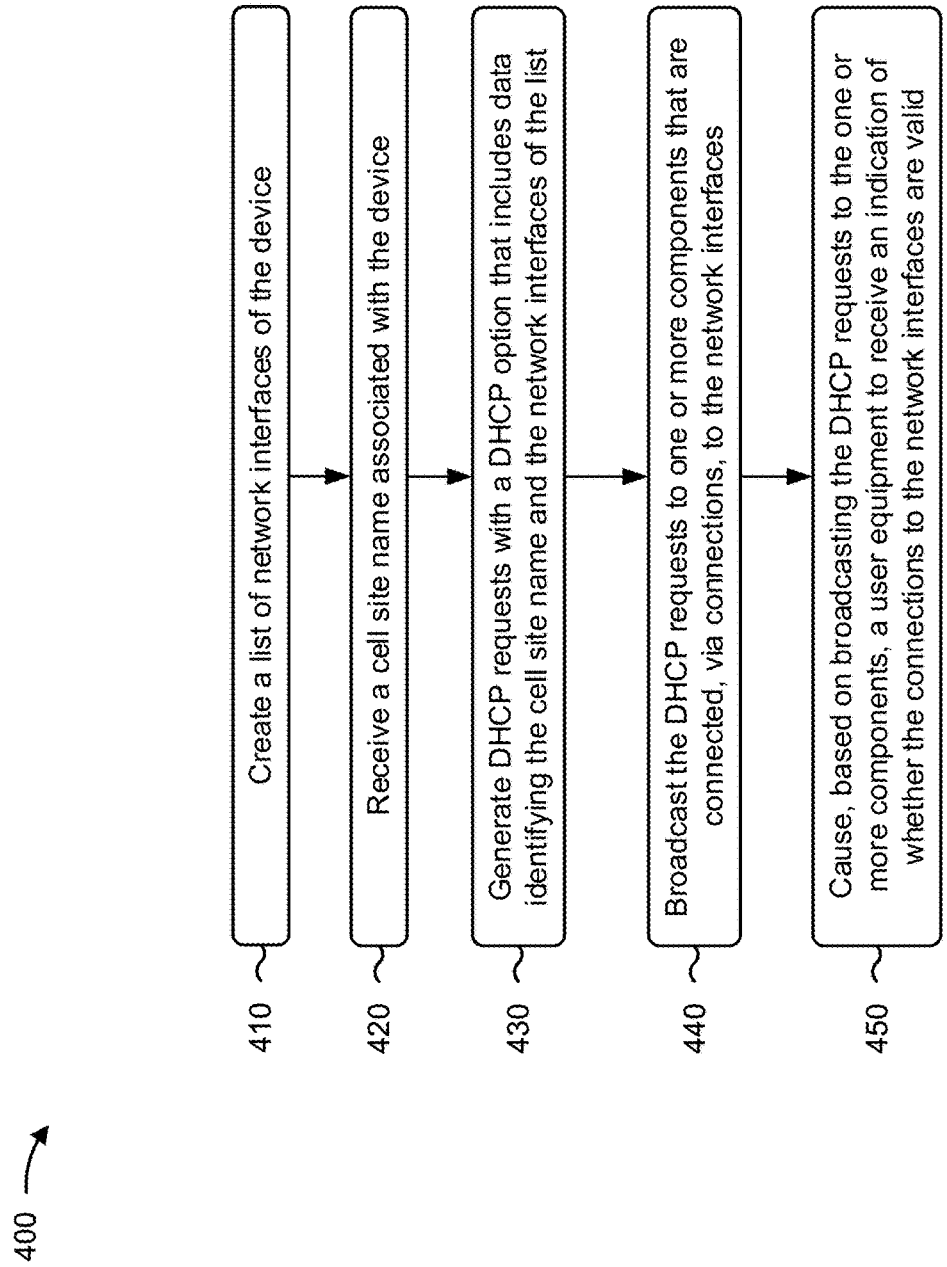
FIG. 4 is a flow chart of an example process for validating network connections of a vDU.

FIG. 4 is a flow chart of an example process 400 for validating network connections of a vDU. In some implementations, one or more process blocks of FIG. 4 may be performed by a device (e.g., the vDU 110). In some implementations, one or more process blocks of FIG. 4 may be performed by another device or a group of devices separate from or including the device, such as a vRAN (e.g., the vRAN 105), a DHCP server (e.g., the DHCP server 125), and/or the like. Additionally, or alternatively, one or more process blocks of FIG. 4 may be performed by one or more components of the device 300, such as the processor 320, the memory 330, the input component 340, the output component 350, and/or the communication interface 360.

As further shown in FIG. 4, process 400 may include creating a list of network interfaces of the device (block 410). For example, the device may create a list of network interfaces of the device, as described above.

As further shown in FIG. 4, process 400 may include receiving a location identifier associated with the device (block 420). For example, the device may receive a location identifier associated with the device, as described above.

As further shown in FIG. 4, process 400 may include generating DHCP requests with a DHCP option that includes data identifying the location identifier and the network interfaces of the list (block 430). For example, the device may generate DHCP requests with a DHCP option that includes data identifying the location identifier and the network interfaces of the list, as described above. In some implementations, the DHCP option includes data identifying the location identifier and slots and port numbers for the network interfaces of the list.

As further shown in FIG. 4, process 400 may include broadcasting the DHCP requests to one or more components that are connected, via connections, to the network interfaces (block 440). For example, the device may broadcast the DHCP requests to one or more components that are connected, via connections, to the network interfaces, as described above. In some implementations, the DHCP requests are forwarded by the one or more components to a DHCP server for determination of whether the connections to the network interfaces are valid.

As further shown in FIG. 4, process 400 may include causing, based on broadcasting the DHCP requests to the one or more components, a user equipment to receive an indication of whether the connections to the network interfaces are valid (block 450). For example, the device may cause, based on broadcasting the DHCP requests to the one or more components, a user equipment to receive an indication of whether the connections to the network interfaces are valid, as described above. In some implementations, the user equipment receives the indication from a DHCP server that determines whether the connections to the network interfaces are valid based on the DHCP requests. In some implementations, the indication includes data indicating one of that the connections are valid when the connections to the network interfaces are validated by a DHCP server, or that at least one connection to at least one of the network interfaces is invalid when the at least one connection is invalidated by the DHCP server. In some implementations, the connections to the network interfaces are valid when the connections are correctly connected to the network interfaces and when the connections are operable.

In some implementations, process 400 includes receiving validation software that causes the device to identify and create the list of the network interfaces and to receive the location identifier.

In some implementations, process 400 includes generating other DHCP requests when the indication indicates that at least one connection is invalid and after correction of the at least one connection; broadcasting the other DHCP requests to the one or more components; and causing, based on broadcasting the other DHCP requests to the one or more components, the user equipment to receive another indication of whether the connections to the network interfaces are valid.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
creating, by a device, a list of network interfaces of the device;
receiving, by the device, a location identifier associated with the device;
generating, by the device, dynamic host configuration protocol (DHCP) requests with a DHCP option that includes data identifying the location identifier and the network interfaces of the list;
broadcasting, by the device, the DHCP requests to one or more components that are connected, via connections, to the network interfaces; and
causing, by the device and based on broadcasting the DHCP requests to the one or more components, a user equipment to receive an indication of whether the connections to the network interfaces are valid.

2. The method of claim 1, further comprising:
receiving validation software that causes the device to identify and create the list of the network interfaces and to receive the location identifier.

3. The method of claim 1, wherein the DHCP option includes data identifying the location identifier and slots and port numbers for the network interfaces of the list.

4. The method of claim 1, wherein the user equipment receives the indication from a DHCP server that determines whether the connections to the network interfaces are valid based on the DHCP requests.

5. The method of claim 1, wherein the indication includes data indicating one of:
that the connections are valid when the connections to the network interfaces are validated by a DHCP server, or
that at least one connection to at least one of the network interfaces is invalid when the at least one connection is invalidated by the DHCP server.

6. The method of claim 1, further comprising:
generating other DHCP requests when the indication indicates that at least one connection is invalid and after correction of the at least one connection;
broadcasting the other DHCP requests to the one or more components; and
causing, based on broadcasting the other DHCP requests to the one or more components, the user equipment to receive another indication of whether the connections to the network interfaces are valid.

7. The method of claim 1, wherein the DHCP requests are forwarded by the one or more components to a DHCP server for determination of whether the connections to the network interfaces are valid.

8. A device, comprising:
a first component configured to:
identify network interfaces of the first component,
create a list of the network interfaces of the first component,
receive a cell site name associated with the device,
generate dynamic host configuration protocol (DHCP) requests with a DHCP option that includes data identifying the cell site name and the network interfaces of the list, and
broadcast the DHCP requests to a second component that is connected, via connections, to the network interfaces; and
the second component configured to:
add data identifying received ports of the second component to the DHCP option to generate modified DHCP requests,
forward the modified DHCP requests to a DHCP server, and
cause, based on forwarding the modified DHCP requests to the DHCP server, a user equipment to receive, from the DHCP server, an indication of whether the connections to the network interfaces are valid.

9. The device of claim 8, wherein the DHCP server determines whether the connections to the network interfaces are valid based on the modified DHCP requests.

10. The device of claim 8, wherein
the first component is further configured to:
generate other DHCP requests when the indication indicates that at least one connection is invalid and after correction of the at least one connection, and
broadcast the other DHCP requests to the second component; and
the second component is further configured to:
add data identifying received ports of the second component to the DHCP option to generate other modified DHCP requests,
forward the other modified DHCP requests to the DHCP server, and
cause, based on forwarding the other modified DHCP requests to the DHCP server, the user equipment to receive, from the DHCP server, another indication of whether the connections to the network interfaces are valid.

11. The device of claim 8, wherein the device includes a virtual radio access network, the first component includes a virtual distributed unit, and the second component includes one of a remote unit or a cell site router.

12. The device of claim 8, wherein the indication includes data indicating one of:
that the connections are valid when the connections to the network interfaces are validated by the DHCP server, or
that at least one connection to at least one of the network interfaces is invalid when the at least one connection is invalidated by the DHCP server.

13. The device of claim 8, wherein the DHCP option includes data identifying the cell site name and slots and port numbers for the network interfaces of the list.

14. The device of claim 8, wherein the connections to the network interfaces are valid when the connections are correctly connected to the network interfaces and when connections are operable.

15. A non-transitory computer-readable medium storing a set of instructions, the set of instructions comprising:
one or more instructions that, when executed by one or more processors of a device, cause the device to:
create a list of network interfaces of the device;
receive a cell site name associated with the device;
generate dynamic host configuration protocol (DHCP) requests with a DHCP option that includes data identifying the cell site name and the network interfaces of the list;
broadcast the DHCP requests to one or more components that are connected, via connections, to the network interfaces; and
cause, based on broadcasting the DHCP requests to the one or more components, a user equipment to receive an indication of whether the connections to the network interfaces are valid.

16. The non-transitory computer-readable medium of claim 15, wherein the DHCP option includes data identifying the cell site name and slots and port numbers for the network interfaces of the list.

17. The non-transitory computer-readable medium of claim 15, wherein the user equipment receives the indication from a DHCP server that determines whether the connections to the network interfaces are valid based on the DHCP requests.

18. The non-transitory computer-readable medium of claim 15, wherein the indication includes data indicating one of:
that the connections are valid when the connections to the network interfaces are validated by a DHCP server, or
that at least one connection to at least one of the network interfaces is invalid when the at least one connection is invalidated by the DHCP server.

19. The non-transitory computer-readable medium of claim 15, wherein the one or more instructions further cause the device to:
generate other DHCP requests when the indication indicates that at least one connection is invalid and after correction of the at least one connection;
broadcast the other DHCP requests to the one or more components; and
cause, based on broadcasting the other DHCP requests to the one or more components, the user equipment to receive another indication of whether the connections to the network interfaces are valid.

20. The non-transitory computer-readable medium of claim 15, wherein the one or more components forward the DHCP requests to a DHCP server for determination of whether the connections to the network interfaces are valid.

* * * * *